(12) United States Patent
Betancur Giraldo et al.

(10) Patent No.: US 9,751,541 B2
(45) Date of Patent: Sep. 5, 2017

(54) SYSTEM FOR DETECTING DEFECTS IN THE ROUNDNESS OF RAILWAY VEHICLE WHEELS

(71) Applicant: UNIVERSIDAD EAFIT, Medellín (CO)

(72) Inventors: German René Betancur Giraldo, Envigado (CO); Leonel Francisco Castañeda Heredia, Medellín (CO); Pedro Fernando Melo, Medellín (CO)

(73) Assignee: Universidad EAFIT, Medellin (CO)

( * ) Notice: Subject to any disclaimer, the term of this patent is extended or adjusted under 35 U.S.C. 154(b) by 42 days.

(21) Appl. No.: 14/781,329

(22) PCT Filed: Apr. 1, 2014

(86) PCT No.: PCT/IB2014/060362
§ 371 (c)(1),
(2) Date: Sep. 30, 2015

(87) PCT Pub. No.: WO2014/162270
PCT Pub. Date: Oct. 9, 2014

(65) Prior Publication Data
US 2016/0031458 A1  Feb. 4, 2016

(30) Foreign Application Priority Data
Apr. 1, 2013  (CO) .................................. 13-059934

(51) Int. Cl.
*B61K 9/12* (2006.01)
*G01M 17/10* (2006.01)
*G01B 7/28* (2006.01)

(52) U.S. Cl.
CPC ............... *B61K 9/12* (2013.01); *G01B 7/282* (2013.01); *G01M 17/10* (2013.01)

(58) Field of Classification Search
None
See application file for complete search history.

(56) References Cited

U.S. PATENT DOCUMENTS 5,247,338 A  9/1993  Danneskiold-Samsoe
5,793,492 A  8/1998  Vanaki
(Continued)

FOREIGN PATENT DOCUMENTS

DE  3309908 C2  2/1987
EP  0907072 A1  7/1999
(Continued)

OTHER PUBLICATIONS

Foreign counterpart office action, Sep. 10, 2015.
Foreign counterpart office action, Mar. 30, 2015.

*Primary Examiner* — Andre Allen
(74) *Attorney, Agent, or Firm* — The Morales Law Firm, LLC; Joseph L. Morales

(57) ABSTRACT

The present invention discloses a device for evaluating the technical condition of the tread of moving railway vehicles, especially for automated inspection of the loss of roundness of each wheel of circulating railway vehicles, in which a point of measurement is used which generates a signal proportional to rail deformation when a wheel arch passes over said point. Then the comparator system compares the measured signal with a wheel pattern without any roundness defects, which is then transmitted over a data network that associates the wheel identification information, with the wheel defect data generated by the comparator system each time the wheel passes over said measurement area.

12 Claims, 5 Drawing Sheets

(56) References Cited

U.S. PATENT DOCUMENTS 7,392,595 B2 * 7/2008 Heimann .............. G01M 17/10
  246/169 R
8,305,567 B2 * 11/2012 Hesser .................... E01B 35/00
  356/237.1

FOREIGN PATENT DOCUMENTS

| EP | 1607726 | A1 | 12/2005 |
| WO | 2006125237 | A1 | 11/2006 |
| WO | 2010100299 | A2 | 9/2010 |

* cited by examiner

SYSTEM FOR DETECTING DEFECTS IN THE ROUNDNESS OF RAILWAY VEHICLE WHEELS

TECHNICAL FIELD

The present invention relates to an automatic system for detecting defects in the roundness of wheels that run on rails. The present invention discloses a device for evaluating the technical condition of the wheel tread on a railway vehicle, especially for detecting loss of roundness, by an array of sensors that record the deformation of the rail when each wheel of the railway vehicle passes over an individual measuring point, making it possible to compare the information with historical measuring data.

BACKGROUND OF THE INVENTION

The loss of roundness on wheels on railway vehicles is a known phenomenon, given it increases the stress generated on the track, such as, e.g., the degradation of components of the track, and an increased stress on the railway vehicle, such as, e.g., damage to the suspension elements, affecting the quality of transport, the cost of operation and maintenance. In order to mitigate this effect, rail operators must perform actions in order preserve the roundness values within the range set by railway norms. In the present invention, railway vehicle refers to any type of vehicle capable of running on a railway.

Generally, the loss of roundness of railway vehicle wheels is detected while the vehicle is stationed at a special facility (e.g. a lathe type truing machine, a machining center, or the like). Therefore, there is a need for automatically evaluating and inspecting the roundness of wheels without removing the vehicle from operation, and particularly for planning maintenance servicing. In this regard, it is necessary to inspect the condition of the railway vehicle wheels running on the track, for which prior art has already discussed sensor measuring by means of devices located on the tracks.

WO2010100299 discloses a method for applying strain gauge sensors, electronic devices and signal processing software to achieve a measurement of stress on the track and rail-wheel contact forces on railways and the like. This technique is characterized for comprising a setup using strain sensors arranged in two plates, for each rail, the geometry of which is specifically designed. The plates are bolted to the rail core, settling on it by means of wedges. Although this technique is advantageous for recording the magnitude of stress on the track and wheel-rail contact force, it is not however equivalent to the technical field of the present invention, given this priority does not consider polygonization detection, eccentricity, or loss of roundness of the wheel.

WO2006125237A1 discloses a method for detecting the shape of wheels running on rails, using a section formed by an alignment of measuring elements arranged on the rails, which receives the effects of stress exerted on the rail, and sends electrical signals corresponding to the displacement of the rails in vertical direction, and preferably also in a transverse direction, to an electronic evaluation device to display the shape of the wheels. This prior art device is characterized in that the testing device builds a set of information based on signals, corresponding to at least the circumference of one wheel, and is comprised by a number of information cells. This priority discloses a process characterized in that signals in the testing devices are calculated in terms of the wheel's rotation angle, which is found in accordance with its diameter. Therefore, a drawback of this priority is that it requires the use of at least one additional optical instrument based on laser optics for measuring the corresponding diameter of the wheel.

EP1607726A1 discloses a method and a device that comprises a sensor array, a processing unit, and a computer program for measuring the features of an object running on a railway track. This document comprises sensors adapted for measuring the effects of the force exerted on the rail by an object, the sensors being coupled to a data processing unit forming a measurement area. Furthermore, the data processing unit is adapted for building at least two virtual measurement sub-ranges, so that the first measurement sub-range corresponds to a first part of the measurement area, and the second sub-range corresponds to a second part of the area following the first area. This priority discloses a process comprised of statistical measurements through a significant increase in the measurement area. Therefore, the length of the measurement range should be enough in relation to the wheel's circumference, in order to record sufficient data. With this prior art solution, the measurement area should be larger than the circumference of a typical wheel running on the rail, which induces a problem, namely, that at least one of the adjacent wheels, such as the wheel on the same bogie, moves simultaneously within the measurement area, and thus the measurement of one wheel interferes with the measurement of the other.

DE3309908A1 discloses a method for detecting flattening in railway wheels on circulating vehicles. To this end, the contact force of the wheel on the track is measured continuously for at least one wheel circumference, by measuring the whole circumference or by the measurement of several sections, and using a plurality of measuring points that form a measuring section. This priority is characterized by calculating an average value corresponding to the contact force of a wheel without flattening, and at least one peak value by applying a low-pass filter. The two values are compared with each other, and the difference between these values or their ratio is the measurement for identifying wheel flattening.

Therefore, there is a need for automatically evaluating and inspecting the roundness of wheels without removing the vehicle from operation, and particularly to plan maintenance servicing considering a single point of measurement, and determining the selection criteria through statistical analysis, i.e., to be able to determine a defect in the roundness of railway vehicle wheels with a single measuring point.

BRIEF DESCRIPTION OF THE INVENTION

The present invention discloses a device for testing the technical condition of the tread of moving trains, especially for automated inspection of the loss of roundness of each wheel of circulating railway vehicles, in which a setup of sensors for recording rail deformation is used.

The system for detecting roundness defects on railway vehicle wheels running on a rail circuit is characterized by comprising: a) an identification system that records information of a railway vehicle wheel; b) a measuring area consisting of a single measurement point located on a section of a rail, which generates a signal proportional to the deformation on the rail when a wheel arch passes over this point; c) a comparator system that receives the signal from the individual measuring point and compares it against a wheel pattern without any roundness defects, in order to generate data about the wheel's defects; and d) a data network that associates wheel identification information with wheel defect data generated by the comparator system.

DETAILED DESCRIPTION OF THE INVENTION

The tread is the central region of the surface of the wheel. It stays in contact with the railhead on straight sections, light curves (non-directional bogies) or tight curves (directional bogies). This region is primarily designed to optimize vehicle stability while providing a radius difference for running on curves. The tread is measured according to the following parameters: thickness and height of the flange and the horizontal distance from the point of measurement of flange thickness up to 2 mm above the lowest point of the flange.

A purpose of the subject invention is to provide a system for automatically detecting roundness defects on railway vehicle wheels running on a rail, by way of an identification system that records wheel and railway vehicle information, a measurement area consisting of a single individual measuring point located on a section of the track, which generates a signal proportional to rail deformation when a wheel arch passes over this point; a comparator system that receives the signal from the individual measuring point and compares it to a wheel pattern without roundness defects in order to generate data on the wheel's defect; and a data network that associates wheel identification information with wheel defect data generated by the comparator system, each time the wheel passes over said measurement area.

Figure 1:
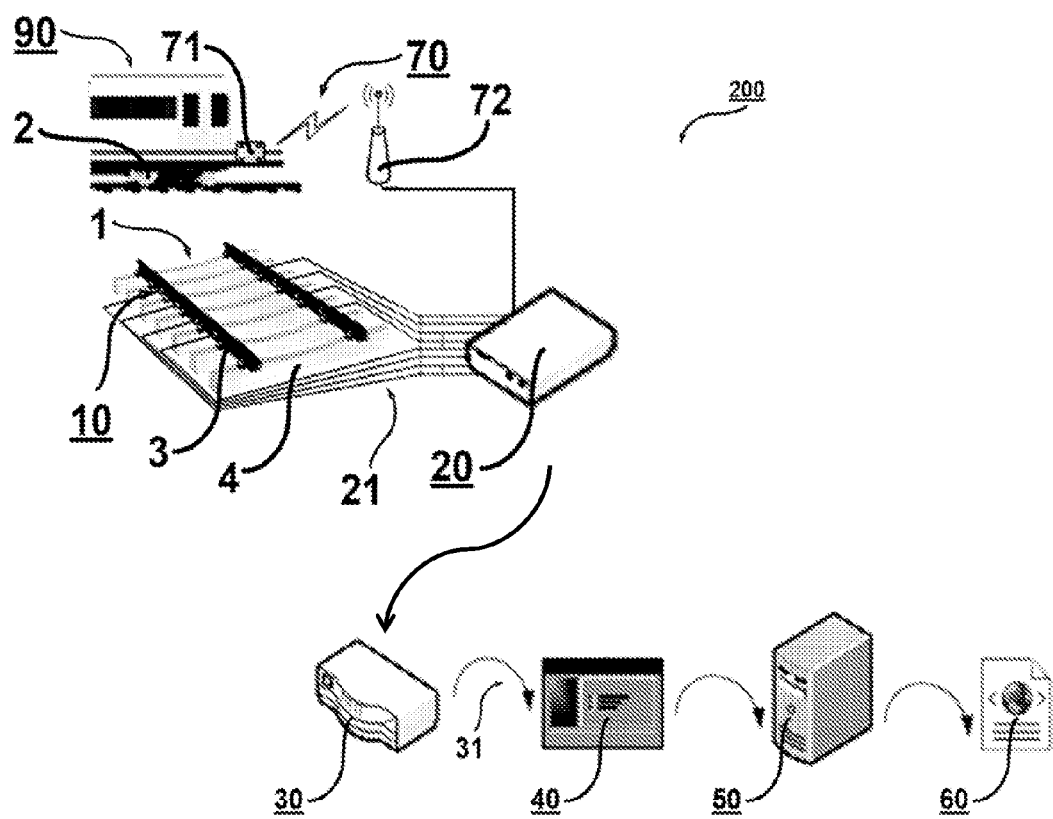
FIG. 1 is a schematic representation of the device of the present invention.

Specifically, and referring to FIG. 1, the invention relates to a device (200) comprising a sensor array (10) setup in a single measurement point located on a stretch of road (1), a transducer (20) that obtains signals about the condition of the wheel (2) and transmits them to a data acquisition device (30), an algorithm (40) that allows processing (50) data, storing it and generating reports (60), and also vehicle identification equipment (70) to record information for each vehicle (90) being sensed.

In a preferred embodiment, the array of sensors (10) is based on piezoelectric materials, and more specifically to strain gauge sensors which sense the vertical bending of a rail (3) on a track (1) due to the load (w) produced by a wheel (2) mounted on a train (90). In the preferred embodiment of the present invention, the array of sensors (10) is provided with copper wires (21) for transmitting a set of analog signals. A data acquisition device (30) converts the set of analog signals into a digital signal. The data acquisition device (30) transmits the digital signal via optical fiber (31) to a network, and subsequently the signal is routed to a server where it is processed (50) and reports are generated (60).

Figure 2:
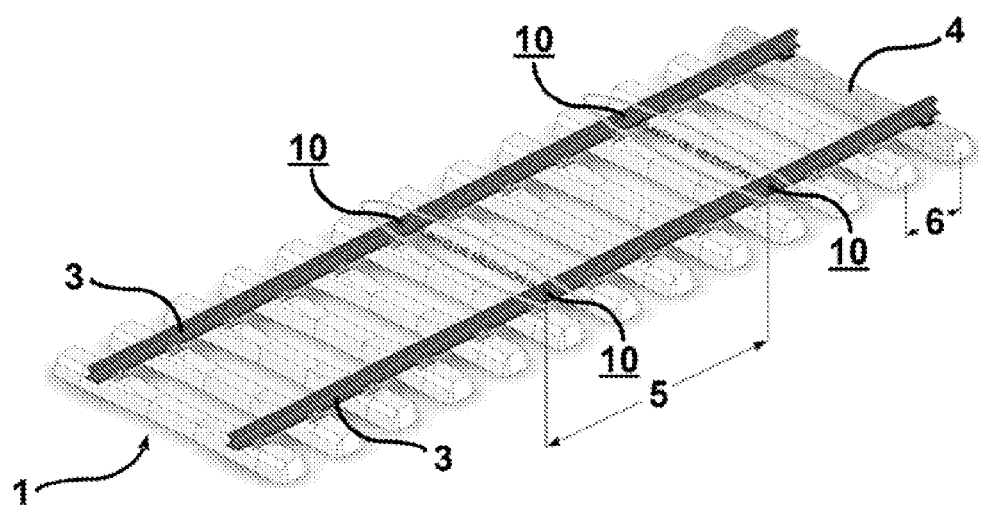
FIG. 2 is a representation of one embodiment of the present invention showing the location of a sensor array on a track for recording the deformation of each rail during the movement of each wheel of the railway vehicle.

With reference to FIG. 2 an embodiment of the invention is shown, wherein a measurement area consisting of a single measurement point located on the rail is shown (3). The measuring point consists of a set of sensors (10) located on a rail (3), such that when the train wheel (90) passes over the rail (3), it exerts a force on the sensors (10), which generate a signal proportional to the deformation on the rail (3). In other embodiments of the present invention, there is an array of sensors (10) on the track (1) secured to the rail (3, having two points of contact, located at a distance (5) corresponding to a separation given by the circumference of the wheel. In the embodiment shown in FIG. 2 the sensor array (10) is located at a multiple of the distance (6) between two consecutive (4) sleepers.

Figure 3:
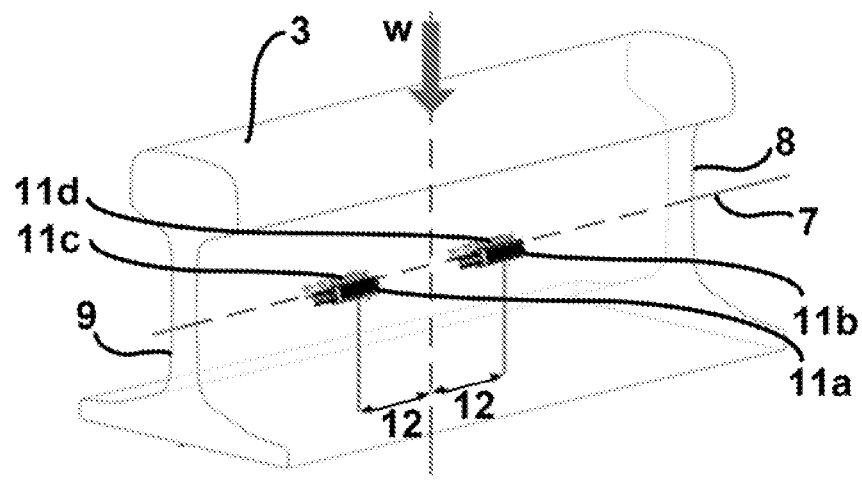
FIG. 3 is a representation of an embodiment of an arrangement of strain gauges within an array of sensors on a rail.

With reference to FIG. 3, a setup with of a single measurement point comprising a sensor array (10) on a rail (3) is shown. In preferred embodiments, the sensor array (10) is comprised of piezoelectric sensors, which in the preferred embodiment comprise a set of strain gauges (11) installed in the core (7) of the rail (3), located symmetrically between two sleepers (4), see also FIG. 6. Optionally, the present invention can be installed in a mirrored fashion in relation to the other two strain gauges (11a and 11b), with two strain gauges (11a and 11b) arranged on the outer side (8) of the rail (3) at a distance (12) between them, and two other strain gauges (11c and 11d) arranged on the inside (9) of the rail (3).

Figure 4:
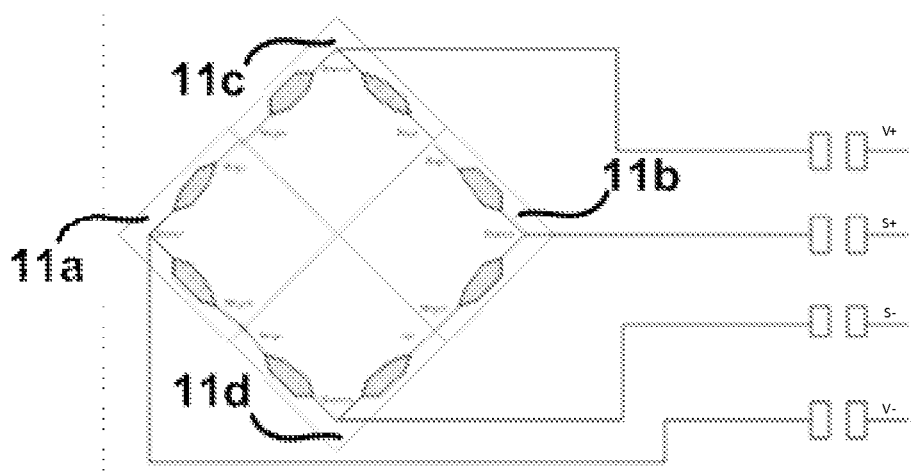
FIG. 4 is a schematic representation showing the electrical circuit configuration of the set of strain gauges.

With reference to FIG. 4, the electrical circuit configuration of the set of strain gauges (11) is shown in full Wheatstone bridge, which allows for differentiating the change in potential of the sensors with greater amplitude. In this embodiment, the outputs are connected directly to the data acquisition device.

The device (200) of the present invention is further provided with an identification system (70) in each vehicle (90), based on radio frequency technology. As shown in FIG. 1 this identification system (70) comprises a set of tags (71) that emit radio frequency information, and an antenna integrated to a reading device (72). Each vehicle (90) has a tag (71) that stores an identification code of the vehicle and information on the condition of its wheels (2).

Figure 5:
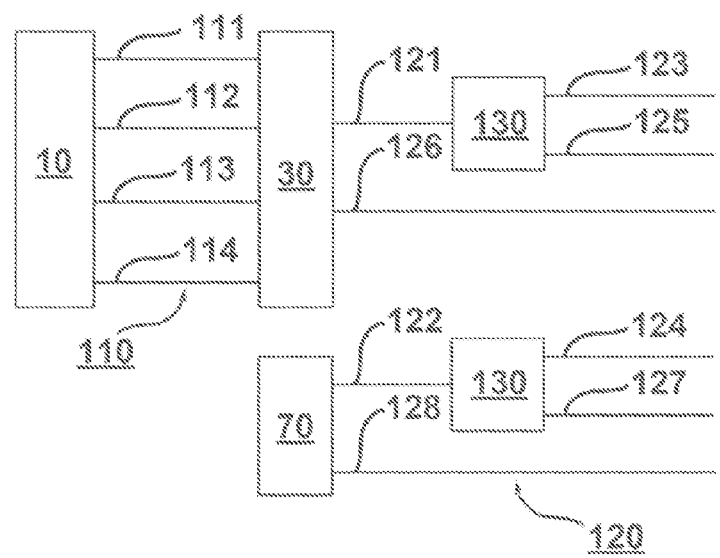
FIG. 5 is a block diagram showing the configuration of electrical connections of the device for automated inspection of loss of roundness of wheels running on rails.

The device (200) comprises elements for overvoltage protection (gas arresters, varistors, fuses, etc.) (100) produced by alteration in the signal currents flowing on the rail (3) and/or the current generated due to weather conditions. The protection system (100) considers the different power sources present in the device (200) and also discriminates electrically conductive lines into two groups, see FIG. 5. A first group of lines (110) is formed by wires in direct contact with the sensor array (10) secured to the rail; such cables are a positive sensor signal line (111), a negative sensor signal line (112), a positive voltage excitation line (113), and a negative voltage excitation line (114); and a second group of lines (120) comprised of wires that have no direct contact with the sensor array (10). These wires are two UTP lines (121 and 122), two optic fiber lines (123 and 124), and four regulated voltage signal lines (125, 126, 127 and 128). In the second group of lines (120) an optical fiber-Ethernet converter (130) and the corresponding data transmission via optical fiber intervene (123 and 124), thus eliminating possible overvoltage in this group of lines, given optical fiber transmission involves no voltage.

With reference to FIG. 1, the device (200) comprises an algorithm (40) that consists of two modules: a data acquisition module and a data processing module having a signal filter stage, a signal peak detection stage, a signal linearization stage, a signal difference estimation stage, an alarm generating stage, a report generating stage and a data storage stage.

In addition to the measurement system placed on the rails, the present invention is comprised of a comparator system that receives the signal from the single point or the individual measuring points, which is then compared against a wheel pattern without any roundness defects, in order to finally generate data pertaining to wheel defects. When a wheel passes over the rail track, the comparator system located in the measurement area receives signals from individual measurement points, and the signal from each wheel is mathematically processed by the comparator system using parameterization mathematics, which in preferred embodiments is of grade 6, set according to the calibration for each type of wheel.

The process for determining the roundness defect of a wheel includes the following steps: i) filtering the signal from the single measuring point; ii) detecting the peaks of said signal; iii) linearizing said signal; iv) calculating the difference between the signal from the measuring area and the pattern signal from the wheel without defects; v) determining a deviation threshold above which it is considered that a defect exists. If the value of the mathematically processed signal exceeds said threshold deviation, the system detects a defect in the roundness of the wheel. If, on the contrary, the value of the processed signal does not reach this threshold, the system does not consider the processed signal a defect regarding the roundness of the wheel.

The system for detecting roundness defects on wheels of railway vehicles of the subject invention is different from prior art, in that the entire identification system, the measurement areas, and the comparator system are connected to a data network that associates wheel identification information with the wheel defect data that are generated by the comparator system each time the wheel is identified in the measurement area. In this regard, the present invention is capable of detecting defects in the roundness of wheels with a single point, based on the fact that the wheel will pass over this point multiple times, enabling measurement each time the wheel passes over the measuring point.

In other embodiments, the subject invention implements at least two contact points within the measurement area, as shown in FIG. 2, wherein the measurement scope on the wheel arch is larger. These two contact points must be spaced by no more than a circumference of the wheel, so as to ensure that the measurement is made on a single wheel.

As a supplement to the present invention, other embodiments may include multiple measurement areas in different stations connected by a data network, which will allow creating a roundness profile for each wheel, ensuring that defects in roundness in one wheel or a set of wheels of the railway vehicle are effectively identified. The present invention's system allows for individual measurement of each wheel of a railway vehicle, and makes possible to know the actual roundness condition in real time, from the data network and the information generated from measurements in each of the individual measuring points.

EXAMPLE OF THE PREFERRED EMBODIMENT OF THE INVENTION

In what follows, the invention will be described, additionally and in a more detailed manner, only as an example and referring to the annexed drawings of the preferred embodiment.

In one exemplary arrangement of the elements of the present invention, the device (200) is located in a measurement area comprised by two measuring points including four sensor arrays (10) arranged on a track (1) consisting of two sections of an instrumented rail (3). The sensor arrays (10) consist of weldable shear-type strain gauges, having a Wheatstone half-bridge configuration, a resistance of 350±1% Ohms, temperature compensation of 6 ppm/° F., a factor of 2.075±1, and connected by a vinyl ribbon type wire with 3 conductors (#26 or #30 AWG).

The protection means (100) against overvoltage are a varistor-type optocoupler isolator, encapsulated in an insulating coating, equipped with a set of mechanical components that allow installation in sensor arrays (10).

The data acquisition device (30) is composed of a signal-conditioning unit near the track (1), a 16 bit analog to digital signal converter, a low-pass filter, a high pass filter, and an anti-alias filter unit.

The signal from each wheel is processed mathematically with a grade 6 parameterization, adjustable according to the calibration of each type of wheel. The remainder of the difference between the pattern of the identified signal and the value of the processed signal is statistically analyzed, in order to obtain the peak-to-peak value of the resulting signal. This value is related percentage wise to the maximum value of the identified signal, where the latter value is compared with an adjustable decision limit with the calibration in order to define the condition of the wheel. If the value of the mathematically processed signal exceeds said threshold deviation, the system detects a defect in the roundness of the wheel. If, on the contrary, the value of the processed signal does not reach this threshold, the system does not consider this processed signal a defect in the roundness of the wheel.

Figure 6:
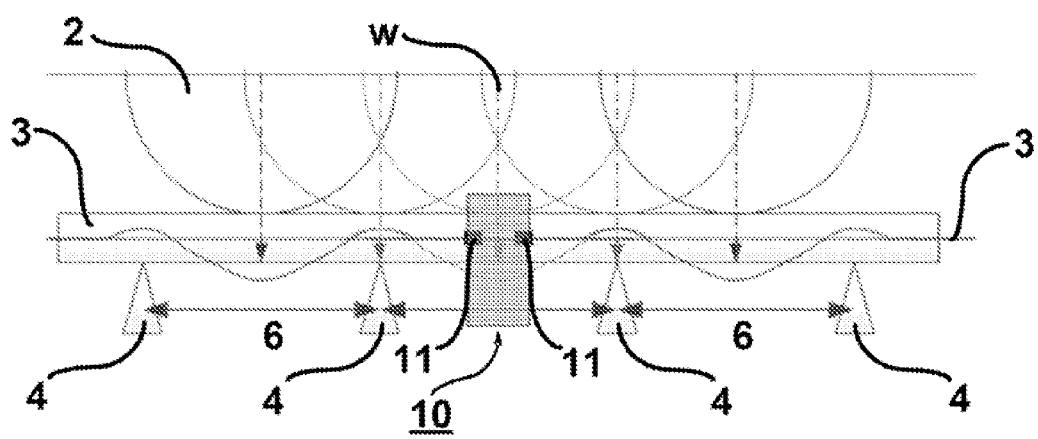
FIG. 6 is a schematic representation showing the arrangement of an array of sensors on a rail to record the deformation of the rail during the movement of a wheel.
Figure 7:
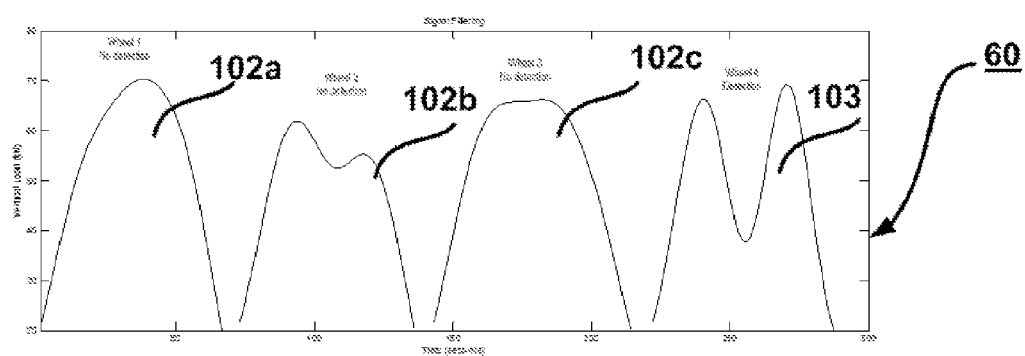
FIG. 7 is a diagram showing the behavior of the signals generated by the stress of four (4) wheels.

FIG. 6 shows the behavior of four wheels (60) with the following characteristics: nominal diameter of 840 mm, made from R8T (UIC 812) steel and a NRC profile type, and a mass of 54.77 Kg/m. In case where the vehicle has a constant acceleration of 0.99 m/s, the first sample (102a) exhibits a normal signal, as does the third signal; these signals resemble a Gaussian bell (102c). In the second measurement, the signal (102b) shows a difference in the peak curve; this signal is evaluated and, despite differing from the previous, as it does not reach the deviation threshold, it is not considered a major defect. In FIG. 6, the fourth signal (103c) shows a noticeable difference in shape, with two representative peaks; this signal is analyzed and represents, according to the application, a wheel with a defect on the tread. According to the number of samples in a period of time, which may be a month, and the amount of processed signals, these are related percentage wise in order to obtain a selection criterion of wheel condition.

It should be understood that the present invention is not limited to the embodiments described and illustrated herein. As it will be apparent to one skilled in the art, there are potential variations and modifications that do not depart from the spirit of the invention, which is only defined by the following claims.

The invention claimed is:

1. A system for detecting roundness defects on wheels of a railway vehicle that runs on a rail circuit, comprising:

a. an identification system comprising a set of tags that emit radio frequency identification for the conditions of each wheel of the railway vehicle;
b. a measuring area consisting of a single measuring point located on a section of a rail, wherein said measuring point generates a signal proportional to the deformation on the rail when a wheel arch passes over this point;
c. a comparator system that receives the signal from the single measuring point, linearizes the signal, and detects a defect in the roundness of a wheel if the value of the mathematically processed signal exceeds a threshold deviation of a mathematical six grade parameterization; and
d. a data network that associates wheel identification information with corresponding defect data generated by the comparator system.

2. The system of claim 1, wherein the measurement area consists of a single measuring point with sensors, spaced by no more than one wheel circumference.

3. The system of claim 1, wherein the defect data allows for the determination of a roundness defect in the wheel, when the signal from the measuring area exceeds the minimum roundness defect threshold measured against the pattern of a wheel without roundness defects.

4. The system of claim 1, wherein the measurement area contains measuring points located on both rails.

5. The system of claim 1, wherein the system further comprises multiple measurement areas along the rail circuit on which a railway vehicle runs.

6. The system of claim 1, wherein the single measuring point consists of a piezoelectric sensor array.

7. The system of claim 6, wherein the piezoelectric sensors are strain gauges.

8. The system of claim 1, wherein the single measuring point comprises two strain gauges arranged on the outer side of the rail, and two additional strain gauges arranged on the inner side of the rail, connected in a Wheatstone bridge arrangement.

9. The system of claim 1, wherein the comparator system comprises surge protection means, produced by the current flowing in the rail.

10. The system of claim 1, wherein the single measuring point comprises two strain gauges arranged on the outer side of the rail, and two additional strain gauges arranged on the inner side of the rail, connected in a Wheatstone bridge arrangement.

11. The system of claim 1, wherein the comparator system comprises surge protection means, produced by the current flowing in the rail.

12. A method for detecting roundness defects on wheels of a railway vehicle that runs on a rail circuit, comprising the steps of:
a. identifying and recording information of the proportional signal from deformation of a rail at a single point of measurement when an arc of a wheel of the rail vehicle circulates over said point;
b. filtering the signal from the single measuring point;
c. detecting/the peaks of said signal;
d. linearizing said signal;
e. calculating the difference between the signal from measurement zone and the standard signal of the wheel without roundness defect; and
f. determining a deviation threshold by means of a mathematical sixth grade parameterization, wherein a defect in roundness exists if such value exceeds such threshold.

* * * * *